United States Patent [19]

Rasshofer et al.

[11] Patent Number: 4,644,016

[45] Date of Patent: Feb. 17, 1987

[54] PROCESS FOR THE PRODUCTION OF POLYURETHANES

[75] Inventors: Werner Rasshofer, Cologne, Fed. Rep. of Germany; Hans-Albrecht Freitag, Coraopolis, Pa.

[73] Assignee: Bayer Aktiengesellschaft, Leverkusen, Fed. Rep. of Germany

[21] Appl. No.: 761,278

[22] Filed: Aug. 1, 1985

[30] Foreign Application Priority Data

Aug. 10, 1984 [DE] Fed. Rep. of Germany ....... 3429503

[51] Int. Cl.$^4$ ..................... C08G 18/14; C08G 18/18; C08G 18/20
[52] U.S. Cl. .................................... 521/129; 528/53; 521/128
[58] Field of Search .......................... 528/53; 521/129

[56] References Cited

U.S. PATENT DOCUMENTS

| | | | |
|---|---|---|---|
| 4,048,107 | 9/1977 | Babiec et al. | 528/53 |
| 4,101,466 | 7/1978 | McEntire | 528/53 |
| 4,342,841 | 8/1982 | Alberino et al. | 528/53 |

OTHER PUBLICATIONS

Kuryla et al., Jour. Org. Chem. 29, 2773 (1964).
Kuryla, Jour. Org. Chem. 30, 3926 (1965).
Schroth et al., Synthesis 1982, 203, 206.
Arndt et al., Annalen 499, 268 (1932).
Angew. Chemie A 59 (1947), pp. 257-272.

*Primary Examiner*—Herbert S. Cockeram
*Attorney, Agent, or Firm*—Gene Harsh; Joseph C. Gil; Lyndanne M. Whalen

[57] ABSTRACT

Polyurethanes are made by reacting a polyisocyanate with a compound containing at least two isocyanate-reactive hydrogen atoms having a molecular weight of from 400 to 10,000 in the presence of a catalyst containing tertiary amino groups. The required catalyst corresponds to the formula

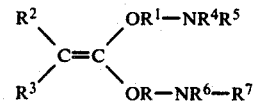

in which R, $R^1$, $R^2$, $R^3$, $R^4$, $R^5$, $R^6$ and $R^7$ represent a specified group or radical. A blowing agent and/or stabilizer and/or chain extending agent and/or other additives commonly used in the production of polyurethanes may optionally be included in the reaction mixture. The catalyst employed in the process is particularly advantageous in that it does not have a noticeable amine odor.

4 Claims, No Drawings

PROCESS FOR THE PRODUCTION OF POLYURETHANES

BACKGROUND OF THE INVENTION

This invention relates to a process for the production of polyurethanes in which ketene acetals containing dialkylamino groups are used as catalysts.

Polyurethanes having a variety of physical properties have long been produced on an industrial scale by the isocyanate-polyaddition process from compounds containing several active hydrogen atoms, more particularly compounds containing hydroxyl and/or carboxyl groups, and polyisocyanates, optionally in the presence of water and/or organic blowing agents, catalysts, emulsifiers and other additives (Angew. Chem. A 59 (1947), page 257).

By suitably selecting the reaction components, it is possible to produce homogeneous or cellular products, elastic and rigid foams as well as materials between those extremes.

Polyurethane foams are preferably produced by mixing liquid components. The starting materials to be reacted with one another may be mixed at the same time or an NCO preadduct may first be prepared with polyols and then foamed.

Tertiary amines have been successfully used as catalysts in the production of polyurethane foams because they are capable of accelerating both the reaction between hydroxyl and/or carboxyl groups and the NCO-groups and also the reaction between water and the isocyanate groups. In a one-shot process, the reactions taking place simultaneously can be coordinated. In addition, the foaming process is accompanied by additional crosslinking reactions in which allophanate, biuret and cyanurate structures are formed. In view of the complexity of the reactions involved, it is necessary to ensure that they take place synchronously by selecting the appropriate catalyst to make certain that the catalyst is not prematurely fixed in the foam through incorporation and does not adversely affect the hydrolytic degradation of the finished foam at a later stage. The odor of many of the tertiary amines commonly used is not however compatible with their application in foams.

SUMMARY OF THE INVENTION

It is an obJect of the present invention to provide new improved catalysts for the production of polyurethanes, particularly polyurethane foams, which catalysts do not have a noticeable amine odor.

It is also an object of the present invention to provide a process for the production of polyurethane foams in which the catalyst is not prematurely fixed in the foam and does not promote hydrolytic degradation of the product foams.

These and other objects which will be apparent to those skilled in the art are accomplished by reacting a polyisocyanate with a compound containing at least two isocyanate-reactive hydrogen atoms having a molecular weight of from 400 to 10,000 in the presence of a catalyst containing tertiary amino groups which catalyst corresponds to a specified formula. A chain extending agent, blowing agent and/or foam stabilizing agent may also be included in the reaction mixture.

DETAILED DESCRIPTION OF THE INVENTION

The present invention relates to a process for the production of optionally foamed polyurethanes by reacting a polyisocyanate with a compound containing at least two isocyanate-reactive hydrogen atoms and having a molecular weight of from 400 to 10,000 in the presence of a catalyst containing tertiary amino groups, optionally in the presence of chain-extending agents having a molecular weight of from 32 to 400, foam stabilizers, water and/or organic blowing agents. Other auxiliaries and additives commonly used in the production of polyurethanes may also be optionally included. The catalyst used is a compound corresponding to the general formula

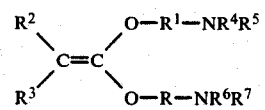

in which

R and $R^1$ which may be the same or different, each represent a difunctional $C_2$–$C_6$-alkyl radical which may optionally be branched and/or contain ether or thioether or amino groups —$NR^8$— or, together, form an optionally methyl- or ethyl-substituted ethylene or n-propylene radical, $R^2$ and $R^3$, which may be the same or different, each represent hydrogen, or an optionally branched $C_1$–$C_6$-alkyl radical, or an optionally halogen- or alkyl-substituted alkenyl, alkinyl, cycloalkyl, aryl or heteroaromatic radical or halogen, $R^4$, $R^5$, $R^6$ and $R^7$, which may be the same or different, each represent a $C_1$–$C_{16}$-alkyl radical; or two $R^4$–$R^7$-radicals may together form a heterocyclic ring containing from 5 to 7 carbon atoms, and $R^8$ represents a $C_1$–$C_{16}$-alkyl or $C_5$–$C_7$-cycloalkyl radical.

According to the invention, preferred catalysts are those corresponding to the above general formula in which R and $R^1$ each represent a $C_2$–$C_3$-alkylene radical, $R^2$ and $R^3$ each represent hydrogen, $R^4$ to $R^7$ each represent a $C_1$–$C_4$-alkyl radical and $R^8$ represents a $C_1$–$C_4$-alkyl radical.

The unpleasant odor characteristic of amines is not noticeable in the catalyst of the present invention either during storage or during foaming. The catalysts of the present invention not only have improved odor properties, they can also be incorporated in the polyurethane matrix in their preferred embodiment even though they do not contain any NCO-active hydrogen atoms. The catalyst is fixed by urea formation, as disclosed for example in U.S. Pat. No. 4,342,841.

The catalysts used in the present invention are known. See, for example, W. C. Kuryla and D. G. Leis, J. Org. Chem. 29, 2773 (1964): W. C. Kuryla, J. Org. Chem. 30, 3926 (1965): W. Schroth et al., Synthesis 1982, 203; 1982, 206.

The catalysts may be produced, for example, by converting the dialkylaminoalkanolate preliminary stages with 1,1-dichloro-1-alkenes (1,1-dichloroethene) into the distillable dialkylamino-alkylene ketene acetals as follows:

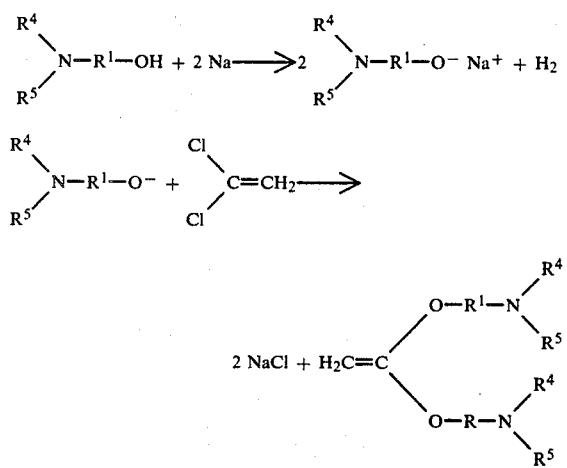

However, the synthesis of the catalyst, which is described in detail in the Examples, may also be carried out in other ways, for example from the o-esters (compare F. Arndt and C. Martins, Justus Liebigs Annalen der Chemie, 499,268).

The catalysts of the present invention are generally used in quantities of from 0.01 to 10 parts by weight, preferably in quantities of from 0.1 to 5 parts by weight and, more preferably, in quantities of from 0.5 to 2.5 parts by weight, based on 100 parts by weight of an optionally foamable polyurethane reaction mixture.

Isocyanates which may be used as starting materials in the process of the present invention include: aliphatic, cycloaliphatic, araliphatic, aromatic and heterocyclic polyisocyanates of the type described for example by W. Siefken in Justus Liebigs Annalen der Chemie, 562, pages 75 to 136, for example those corresponding to the formula

in which:

n=2-4, preferably 2, and

Q represents an aliphatic hydrocarbon radical containing from 4 to 18 carbon atoms (preferably from 6 to 10 carbon atoms), a cycloaliphatic hydrocarbon radical containing from 4 to 15 (preferably from 5 to 10) carbon atoms, an aromatic hydrocarbon radical containing from 6 to 15 carbon atoms (preferably from 6 to 13 carbon atoms), or an araliphatic hydrocarbon radical containing from 8 to 15 carbon atoms (preferably from 8 to 13 carbon atoms).

Specific examples of such isocyanates are: 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers, 1-isocyanato-3,3,5-trimethyl-5-isocyanatomethyl cyclohexane (German Auslegeschrift No. 1,202,785, U.S. Pat. No. 3,401,190), 2,4- and 2,6-hexahydrotolylene diisocyanate and mixtures of these isomers, hexahydro-1,3- and/or 1,4-phenylene diisocyanate, perhydro-2,4'- and/or -4,4'-diphenyl methane diisocyanate, 1,3- and 1,4-phenylene diisocyanate, 2,4- and 2,6-tolylene diisocyanate and mixtures of these isomers, diphenyl methane-2,4'- and/or -4,4'-diisocyanate, naphthylene-1,5-diisocyanate.

It is also possible to use triphenyl methane-4,4',4"-triisocyanate; polyphenyl polymethylene polyisocyanates of the type obtained by condensing aniline with formaldehyde, followed by phosgenation, and described for example in British Pat. Nos. 874,430 and 848,671; m- and p-isocyanatophenyl sulfonyl isocyanates according to U.S. Pat. No. 3,454,606; perchlorinated aryl polyisocyanates of the type described in German Auslegeschrift No. 1,157,601 (U.S. Pat. No. 3,277,138); polyisocyanates containing carbodiimide groups of the type described in German Pat. No. 1,092,007 (U.S. Pat. No. 3,152,162) and in German Offenlegungsschriften Nos. 2,504,400; 2,537,685 and 2,552,250; norbornane diisocyanates according to U.S. Pat. No. 3,492,330; polyisocyanates containing allophanate groups of the type described in British Pat. No. 994,890, in Belgian Pat. No. 761,626 and in Dutch Patent Application No. 7,102,524; polyisocyanates containing isocyanurate groups of the type described in U.S. Pat. No. 3,001,973; German Pat. Nos. 1,022,789; 1,222,067 and 1,027,394 and in German Offenlegungsschriften Nos. 1,929,034 and 2,004,048; polyisocyanates containing urethane groups of the type described in Belgian Pat. No. 752,261 or U.S. Pat. Nos. 3,394,164 and 3,644,457; polyisocyanates containing acylated urea groups according to German Pat. No. 1,230,778; polyisocyanates containing biuret groups of the type described for example in U.S. Pat. Nos. 3,124,605; 3,201,372 and in British Pat. No. 889,050; polyisocyanates produced by telomerization reactions of the type described for example in U.S. Pat. No. 3,654,106; polyisocyanates containing ester groups of the type described for example in British Pat. Nos. 965,474 and 1,072,956, in U.S. Pat. No. 3,567,763 and in German Pat. No. 1,231,688; reaction products of the above-mentioned diisocyanates with acetals according to German Pat. No. 1,072,385; and polyisocyanates containing polymeric fatty acid esters according to U.S. Pat. No. 3,455,883.

It is also possible to use the isocyanate-group-containing distillation residues obtained in the commercial production of isocyanates, optionally in solution in one or more of the above-mentioned polyisocyanates. It is also possible to use any mixtures of the above-mentioned polyisocyanates.

In general, it is particularly preferred to use the commercially readily available polyisocyanates, such as 2,4- and 2,6-tolylene diisocyanate, and any mixtures of these isomers ("TDI"); polyphenyl polymethylene polyisocyanates of the type obtained by condensing aniline with formaldehyde, followed by phosgenation ("crude MDI"): and polyisocyanates containing carbodiimide groups, urethane groups, allophanate groups, isocyanurate groups, urea groups or biuret groups ("modified polyisocyanates"), particularly modified polyisocyanates of the type derived from 2,4- and/or 2,6-tolylene diisocyanate or from 4,4'- and/or 2,4'-diphenyl methane diisocyanate.

Compounds containing at least two isocyanate-reactive hydrogen atoms and having a molecular weight of generally from 400 to 10,000 which may be used as a starting material in the process of the present invention include compounds containing amino groups, thiol groups or carboxyl groups and preferably compounds containing hydroxyl groups, particularly compounds containing from 2 to 8 hydroxyl groups, preferably those having molecular weights of from 1000 to 8000, most preferably from 1500 to 6000. Examples of such compounds include polyesters, polyethers, polythioethers, polyacetals, polycarbonates and polyester amides containing at least 2, generally from 2 to 8, but preferably from 2 to 4 hydroxyl groups of the type used for the production of homogeneous and cellular polyurethanes.

Polyesters containing hydroxyl groups suitable for use in accordance with the present invention are, for example, reaction products of polyhydric (preferably dihydric and, optionally, trihydric) alcohols with polybasic (preferably dibasic) carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or unsaturated.

Examples of carboxylic acids such as these and their derivatives are succinic acid, adipic acid, suberic acid, azelaic acid, sebacic acid, phthalic acid, isophthalic acid, triellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids (optionally in admixture with monomeric unsaturated fatty acids, such as oleic acid), terephthalic acid dimethyl ester and terephthalic acidbis-glycol ester. Suitable polyhydric alcohols are, for example, ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, 1,2,4-butane triol, trimethylol ethane, pentaerythritol, quinitol, mannitol and sorbitol, formitol, methyl glycoside, diethylene glycol, triethylene glycol, tetraethylene glycol and higher polyethylene glycols, dipropylene glycol and higher polypropylene glycols, dibutylene glycol and higher polybutylene glycols. The polyesters may contain terminal carboxyl groups. Polyesters of lactones, for example ε-caprolactone, or of hydroxy carboxylic acids, for example ω-hydroxy caproic acid, may also be used.

Polyethers containing at least 2, generally 2 to 8 and preferably 2 to 3 hydroxyl groups suitable for use in accordance with the present invention are also known. Such polyethers may be obtained for example by polymerizing epoxides (such as ethylene oxide, propylene oxide, butylene oxide, tetrahydrofuran, styrene oxide or epichlorohydrin) themselves, for example in the presence of Lewis catalysts (such as $BF_3$) or by the addition of these epoxides (preferably ethylene oxide and propylene oxide, optionally in admixture or successively) with starter components containing reactive hydrogen atoms, such as water, alcohols, ammonia or amines. Specific examples of starter components are ethylene glycol, 1,3-propylene glycol, 1,2-propylene glycol, trimethylol propane, glycerol, sorbitol, 4,4'-dihydroxy diphenyl propane, aniline, ethanolamine and ethylene diamine. Sucrose polyethers of the type described for example in German Auslegeschriften Nos. 1,176,358 and 1,064,938 and formitol-or formose-started polyethers (German Offenlegungsschriften Nos. 2,639,083 and 2,737,951) may also be used in accordance with the invention. In many cases, it is preferred to use polyethers which predominantly contain primary OH-groups (up to 90 wt. %, based on all the OH-groups present in the polyether). Polybutadienes containing OH-groups are also suitable for use in accordance with the present invention.

Polythioethers useful as starting materials in the present invention include the condensation products of thiodiglycol on its own and/or with other glycols, dicarboxylic acids, formaldehyde, aminocarboxylic acids or amino alcohols. Depending upon the co-components, the products may be polythio mixed ethers, polythioether esters or polythioether ester amides.

Suitable polyacetal starting materials for the process of the present invention are, for example, the compounds obtainable from glycols such as diethylene glycol, triethylene glycol, 4,4'-dioxethoxy diphenyl dimethyl methane, hexane diol and formaldehyde. Other polyacetals useful in the process of the present invention may also be obtained by polymerizing cyclic acetals such as trioxane (German Offenlegungsschrift No. 1,694,128).

Polycarbonates containing hydroxyl groups useful in the present invention are known and may be obtained for example by reacting diols (such as 1,3-propane diol, 1,4-butane diol and/or 1,6-hexane diol, diethylene glycol, triethylene glycol, tetraethylene glycol or thiodiglycol) with diaryl carbonates (for example diphenyl carbonate), or phosgene (German Ausleschriften Nos. 1,694,080, 1,915,908 and 2,221,751; German Offenlegungsschrift No. 2,605,024).

The polyester amides and polyamides which may be used as starting materials in the process of the present invention include the predominantly linear condensates obtained for example from polybasic saturated or unsaturated carboxylic acids or their anhydrides and polyhydric saturated or unsaturated amino alcohols, diamines, polyamines and mixtures thereof.

Polyhydroxyl compounds already containing urethane or urea groups and optionally modified natural polyols, such as castor oil or carbohydrates (for example starch), may also be used in the present invention. Addition products of alkylene oxides with phenol-formaldehyde resins or even with urea-formaldehyde resins may also be used.

Before they are used in the polyisocyanate-polyaddition process, the above-mentioned polyhydroxyl compounds may be modified in various ways. According to German Offenlegungsschriften Nos. 2,210,839 (U.S. Pat. No. 3,849,515) and 2,544,195, a mixture of different polyhydroxy compounds (for example a polyether polyol and a polyester polyol) may be condensed by etherification in the presence of a strong acid to form a relatively high molecular weight polyol which is made up of different segments attached through ether bridges. It is also possible, in accordance with German Offenlegungsschrift No. 2,559,372, to introduce amide groups into the polyhydroxyl compounds or, in accordance with German Offenlegungsschrift No. 2,620,487, to introduce triazine groups by reaction with polyfunctional cyanic acid esters. The reaction of a polyol with a less than equivalent quantity of a diisocyanatocarbodiimide, followed by reaction of the carbodiimide group with an amine, amide, phosphite or carboxylic acid, gives polyhydroxyl compounds containing guanidine, phosphono-formamidine or acyl urea groups (German Offenlegungsschriften Nos. 2,714,289; 2,714,292 and 2,714,293). In some cases, it is of particular advantage to completely or partly convert the relatively high molecular weight polyhydroxyl compounds into the corresponding anthranilic acid esters by reaction with isatoic acid anhydride, as described in German Offenlegungsschriften Nos. 2,019,432 and 2,619,840 and in U.S. Pat. Nos. 3,808,250; 3,975,428 and 4,016,143. Relatively high molecular weight compounds containing terminal aromatic amino groups are obtained in this way.

According to German Offenlegungsschrift No. 2,546,536 and U.S. Pat. No. 3,865,791, relatively high molecular weight compounds containing terminal amino groups are obtained by reacting NCO prepolymers with enamines, aldimines or ketimines containing hydroxyl groups, followed by hydrolysis. Other processes for producing relatively high molecular weight compounds containing terminal amino groups or hydrazide groups are described in German Offenlegungsschriften Nos. 1,694,152 (U.S. Pat. No. 3,625,871): 2,948,419; 3,039,600; 3,131,252 and 3,223,298.

It is also possible to use polhydroxyl compounds containing high molecular weight polyadducts and polycondensates or polymers in finely disperse or dissolved form. Polyhydroxyl compounds such as these may be obtained for example by polyaddition reactions (for example reactions between polyisocyanates and aminofunctional compounds) and polycondensation reactions (for example between formaldehyde and phenols and/or amines) in situ in the above-mentioned compounds containing hydroxyl groups. Processes such as these are described for example in German Auslegeschriften Nos. 168,075 and 1,260,142 and in German Offenlegungsschriften Nos. 2,324,134; 2,423,984; 2,512,385; 2,513,815; 2,550,796; 2,550,797; 2,550,833; 2,550,862; 2,633,293 and 2,639,254. However, it is also possible, in accordance with U.S. Pat. No. 3,869,413 or German Offenlegungsschrift No. 2,550,860 to mix an aqueous polymer dispersion with a polyhydroxyl compound and subsequently to remove the water from the mixture.

Polyhydroxyl compounds modified by vinyl polymers obtained for example by polymerizing styrene and acrylonitrile in the presence of polyethers (U.S. Pat. Nos. 3,383,351; 3,304,273; 3,523,093 and 3,110,695; German Auslegeschrift No. 1,152,536) or polycarbonate polyols (German Pat. No. 1,769,795; U.S. Pat. No. 3,637,909) are also suitable for use in the process of the present invention. Plastics having particularly good flameproof properties are obtained by using polyether polyols modified in accordance with German Offenlegungsschriften Nos. 2,442,101; 2,644,922 and 2,646,141 by graft polymerization with vinyl phosphonic acid esters and, optionally, (meth)acrylonitrile, (meth)acrylamide or OH-functional (meth)acrylic acid esters. Polyhydroxyl compounds into which carboxyl groups have been introduced by radical graft polymerization with unsaturated carboxylic acids and, optionally, other olefinically unsaturated monomers (German Offenlegungsschriften Nos. 2,714,291; 2,739,620 and 2,654,746) may be used with particular advantage in combination with mineral fillers.

Where modified polyhydroxyl compounds of the type mentioned above are used as starting components in the polyisocyanate-polyaddition process, polyurethane plastics having considerably improved mechanical properties are formed in many cases.

Other representatives of the above-mentioned compounds useful in the present invention are described for example in High Polymers, Vol. XVI, "Polyurethanes, Chemistry and Technology", by Saunders-Frisch, Interscience Publishers, New York/London, Vol. I, 1962, pages 32 to 42 and pages 44 to 54 and Vol. II, 1964, pages 5–6 and 198–199, and in Kunststoff-Handbuch, Vol. VII, Vieweg-Hochtlen, Carl-Hanser-Verlag, Munich, 1966, for example on pages 45 to 71. It is of course possible to use mixtures of the above-mentioned compounds containing at least two isocyanate-reactive hydrogen atoms and having a molecular weight of from 400 to 10,000, such as mixtures of polyethers and polyesters.

In some cases, it is of particular advantage to combine low-melting and high-melting polyhydroxyl compounds with one another (German Offenlegungsschrift No. 2,706,297).

Optional starting materials include compounds containing at least two isocyanate-reactive hydrogen atoms and having a molecular weight of from 32 to 400. These compounds may contain hydroxyl groups and/or amino groups and/or thiol groups and/or carboxyl groups, preferably hydroxyl groups and/or amino groups. These compounds which generally contain from 2 to 8 and preferably from 2 to 4 isocyanate-reactive hydrogen atoms serve as chain extenders or crosslinkers. It is also possible to use mixtures of different compounds containing at least two isocyanate-reactive hydrogen atoms and having a molecular weight in the range of from 32 to 400.

Examples of such compounds are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, dibromobutene diol (U.S. Pat. No. 3,723,392), glycerol, trimethylol propane, 1,2,6-hexane triol, trimethylol ethane, pentaerythritol, quinitol, mannitol and sorbitol, castor oil, diethylene glycol, triethylene glycol, tetraethylene glycol, higher polyethylene glycols having a molecular weight of up to 400, dipropylene glycol, higher polypropylene glycols having a molecular weight of up to 400, dibutylene glycol, higher polybutylene glycols having a molecular weight of up to 400, 4,4'-dihydroxy diphenyl propane, dihydroxy methyl hydroquinone, ethanolamine, diethanolamine, N-methyl diethanolamine, triethanolamine and 3-aminopropanol.

Other low molecular weight polyols suitable for the purposes of the invention are mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschriften Nos. 2,639,084; 2,714,104; 2,721,186; 2,738,154 and 2,714,512). In order to obtain plastics with improved flame resistance, these formoses are advantageously used in combination with aminoplast formers and/or phosphites (German Offenlegungsschriften Nos. 2,738,513 and 2,738,532). Solutions of polyisocyanate polyaddition products, particularly solutions of polyurethane ureas containing ionic groups and/or solutions of polyhydrazodicarbonamides, in low molecular weight polyhydric alcohols may also be used as a polyol component in accordance with the invention (German Offenlegungsschrift No. 2,638,759).

Aliphatic diamines suitable for use in accordance with the present invention are, for example, ethylene diamine, 1,4-tetramethylene diamine, 1,11-undecamethylene diamine, 1,12-dodecamethylene diamine and mixtures thereof, 1-amino-3,3,5-trimethyl-5-aminomethyl cyclohexane ("isophorone diamine"), 2,4- and 2,6-hexahydrotolylene diamine and mixtures thereof, perhydro-2,4'- and -4,4'-diaminodiphenyl methane, p-xylylene diamine, bis-(3-aminopropyl)-methylamine, diaminoperhydro anthracenes (German Offenlegungsschrift No. 2,638,731) and cycloaliphatic triamines according to German Offenlegungsschrift No. 2,614,244. It is also possible to use hydrazine and substituted hydrazines, such as methyl hydrazine, N,N'-dimethyl hydrazine and their homologs and also acid dihydrazides, such as carbodihydrazide, oxalic acid dihydrazide, the dihydrazides of malonic acid, succinic acid, glutaric acid, adipic acid, β-methyl adipic acid, sebacic acid, hydracrylic acid and terephthalic acid, semicarbazido alkylene hydrazides such as β-semicarbazido propionic acid hydrazide (German Offenlegungsschrift No. 1,770,591), semicarbazido alkylene carbazinic esters such as 2-semicarbizido ethyl carbazinic ester (German Offenlegungsschrift No. 1,918,504) or even amino-semicarbazide compounds such as -aminoethyl semicarbazido carbonate (German Offenlegungsschrift No. 1,902,931). To control their reactivity, the amino groups may be completely or partly blocked by aldimine or ketimine groups (U.S. Pat. No. 3,734,894; German Offenlegungsschrift No. 2,637,115).

Examples of suitable aromatic diamines are bis-anthranilic acid esters according to German Offenlegungsschriften Nos. 2,040,644 and 2,160,590; 3,5- and 2,4-diamino-benzoic acid esters according to German Offenlegungsschrift No. 2,025,900; the diamines containing ester groups described in German Offenlegungsschriften Nos. 1,803,635 (U.S. Pat. Nos. 3,681,290 and 3,736,350); 2,040,650 and 2,160,589; the diamines containing ether groups according to German Offenlegungsschriften Nos. 1,770,525 and 1,809,172 (U.S. Pat. Nos. 3,654,364 and 3,736,295); 2-halogen-1,3phenylene diamines optionally substituted in the 5-position (German Offenlegungsschriften Nos. 2,001,772; 2,025,896 and 2,065,869); 3,3'-dichloro-4,4'-diaminodiphenyl methane; tolylene diamine; 4,4'-diaminodiphenyl methane; 4,4'-diaminodiphenyl disulfides (German Offenlegungsschrift No. 2,404,976); diaminodiphenyl dithioethers (German Offenlegungsschrift No. 2,509,404); aromatic diamines substituted by alkyl thio groups (German Offenlegungsschrift No. 2,638,760); diaminobenzene phosphonic acid esters (German Offenlegungsschrift No. 2,459,491); aromatic diamines containing sulfonate or carboxylate groups (German Offenlegungsschrift No. 2,720,166); and the high-melting diamines described in German Offenlegungsschrift No. 2,635,400. Examples of aliphatic-aromatic diamines are the aminoalkyl thioanilines according to German Offenlegungsschrift No. 2,734,574.

Other suitable chain extenders are such compounds as 1-mercapto-3-amino-propane, optionally substituted amino acids (for example glycine, alanine, valine, serine and lysine) and optionally substituted dicarboxylic acids (for example succinic acid, adipic acid, phthalic acid, 4-hydroxy phthalic acid and 4-aminophthalic acid).

Isocyanate-monofunctional compounds may be used as so-called chain terminators in proportions of from 0.01 to 10 wt. %, based on polyurethane solids. Monofunctional compounds such as these are monoamines, such as butyl and dibutylamine, octylamine, stearylamine, N-methyl stearylamine, pyrrolidone, piperidine and cyclohexylamine; monoalcohols such as butanol, 2-ethyl hexanol, octanol, dodecanol; the various amyl alcohols; cyclohexanol and ethylene glycol monoethyl ether.

Other polyols having a molecular weight of up to 400 suitable for use in accordance with the invention are ester diols corresponding to the general formulae

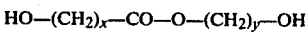

and

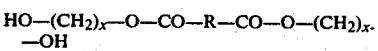

in which R is an alkylene radical containing from 1 to 10 (preferably from 2 to 6) C-atoms or a cycloalkylene or arylene radical containing from 6 to 10 C-atoms,
x=2 to 6 and
y=3 to 5.

Specific examples of such compounds are δ-hydroxylbutyl-ε-hydroxycaproic acid ester, ω-hydroxylhexyl-γ-hydroxybutyric acid ester, adipic acid bis-β-hydroxylethyl)-ester and terephthalic acid bis-(β-hydroxyethyl)-ester. Diol urethanes corresponding to the general formula

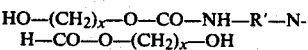

in which
R' is an alkylene radical containing from 2 to 15 (preferably from 2 to 6) C-atoms or a cycloalkylene or arylene radical containing from 6 to 15 C-atoms and x is an integer from 2 to 6 may also be used. Specific examples are 1,6-hexamethylene-bis-(β-hydroxyethylurethane) and 4,4'-diphenylmethane-bis-(δ-hydroxybutylurethane).

Diol urethanes corresponding to the general formula

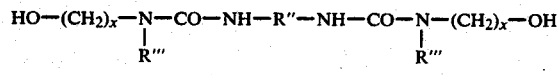

in which
R" is an alkylene radical containing from 2 to 15 (preferably from 2 to 9) C-atoms or a cycloalkylene or arylene radical containing from 6 to 15 C-atoms, R''' represents hydrogen or a methyl group and x is the number 2 or 3, may also be used. Specific examples are 4,4'-diphenylmethane-bis-(β-hydroxylethylurea) and the compound

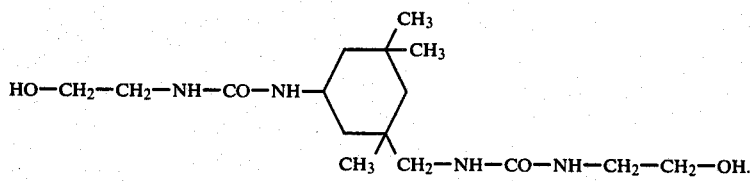

For some purposes, it is of advantage to use polyols containing sulfonate and/or phosphonate groups (German Offenlegungsschrift No. 2,719,372), preferably the adduct of bisulfite with 1,4-butane diol or alkoxylation products thereof.

Optional additives and auxiliaries which may be used in the process of the present invention include water and/or readily volatile inorganic or organic substances as blowing agents. Organic blowing agents include acetone; ethyl acetate; halogen-substituted alkanes, such as methylene chloride, chloroform, ethylidene chloride, vinylidene chloride, monofluorotrichloromethane, chlorodifluoromethane, dichlorodifluoromethane; also butane, hexane, heptane or diethyl ether. Inorganic blowing agents are, for example, air, $CO_2$ or $N_2O$. A blowing effect may also be obtained by adding compounds which decompose at temperatures above room temperature giving off gases, such as nitrogen, for example azo compounds (such as azodicarbonamide or azoisobutyronitrile). Other examples of blowing agents and information on the use of blowing agents may be found in Kunststoff-Handbuch, Vol. VII, by Vieweg and Hochtlen, Carl-Hanser-Verlag, Munich, 1966, on pages 108 and 109, 453 to 455 and 507 to 510.

Known catalysts such as tertiary amines, may also optionally be used in the process of the present invention. Specific examples of appropriate catalysts are triethylamine, tributylamine, N-methyl morpholine, N-ethyl morpholine, N,N,N',N'-tetramethyl ethylene diamine, pentamethyl diethylene triamine and higher homologs (German Offenlegungsschriften Nos. 2,624,527 and 2,624,528), 1,4-diazabicyclo-(2,2,2)-octane, N-methyl-N'-dimethylaminoethyl piperazine, bis-(dimethylaminoalkyl)-piperazines (German Offenlegungsschrift No. 2,636,787), N,N-dimethyl benzyl amine, N,N-dimethyl cyclohexylamine, N,N-diethyl benzylamine, bis-(N,N-diethylaminoethyl)-adipate, N, N,N',N'-tetramethyl-1, 3-butane diamine, N,N-dimethyl-$\beta$-phenyl ethylamine, 1,2-dimethyl imidazole, 2-methyl imidazole, monocyclic and bicyclic amidines (German Offenlegungsschrift No. 1,720,633), bis-(dialkylamino)-alkyl ethers (U.S. Pat. No. 3,330,782, German Auslegeschrift No. 1,030,558, German Offenlegungsschriften Nos. 1,804,361 and 2,618,280) and tertiary amines containing amide groups (preferably formamide groups) according to German Offenlegungsschriften No. 2,523,633 and 2,732,292. Suitable catalysts also include known Mannich bases of secondary amines, such as dimethylamine; aldehydes, preferably formaldehyde; ketones, such as acetone, methylethyl ketone and cyclohexanone; and phenols, such as phenol, nonyl phenol and bisphenol.

Tertiary amines containing isocyanate-reactive hydrogen atoms suitable for use as catalysts are, for example, triethanolamine, triisopropanolamine, N-methyl diethanolamine, N-ethyl diethanolamine, N,N-dimethyl ethanolamine, their reaction products with alkylene oxides (such as propylene oxide and/or ethylene oxide) and also secondary-tertiary amines according to German Offenlegungsschrift No. 2,732,292.

Other suitable catalysts are sila-amines containing carbon-silicon bonds, of the type described in German Pat. No. 1,229,290 (corresponding to U.S. Pat. No. 3,620,984), for example 2,2,4-trimethyl-2-silamorpholine and 1,3-diethylaminomethyl tetramethyl disiloxane.

Nitrogen-containing bases (such as tetralkyl ammonium hydroxides), alkali hydroxides (such as sodium hydroxide), alkali phenolates (such as sodium phenolate), or alkali alcoholates (such as sodium methylate) may also be used as catalysts. Hexahydrotriazines may also be used as catalysts (German Offenlegungsschrift No. 1,769,043).

The reaction between NCO-groups and Zerewitinoff-active hydrogen atoms is also greatly accelerated by lactams and azalactams, an associate between the lactam and the compound containing acid hydrogen initially being formed. Associates such as these and their catalytic effects are described in German Offenlegungsschriften Nos. 2,062,286: 2,062,288: 2,117,576 (U.S. Pat. No. 3,758,444); 2,129,198: 2,330,175 and 2,330,211.

It is also possible to use organometallic compounds, particularly organo tin compounds, as catalysts. In addition to sulfur-containing compounds, such as di-n-octyl tin mercaptide (German Auslegeschrift No. 1,769,367: U.S. Pat. No. 3,654,927), preferred organotin compounds are tin(II)salts of carboxylic acids (such as tin-(II)acetate, tin(II)octoate, tin(II)ethyl hexoate and tin-(II)laurate), and tin(IV)compounds (for example, dibutyl tin oxide, dibutyl tin dichloride, dibutyl tin diacetate, dibutyl tin dilaurate, dibutyl tin maleate and dioctyl tin diacetate).

All the above-mentioned catalysts may of course be used in the form of mixtures. In this respect, combinations of organometallic compounds and amidines, aminopyridines or hydrazino pyridines (German Offenlegungsschriften Nos. 2,434,185; 2,601,082 and 2,603,834) are of particular interest.

Other representatives of catalysts suitable for use in accordance with the invention and information on the way in which they work can be found in Kunststoff-Handbuch by Vieweg and Hochtlen, Vol. VII, Carl-Hanser-Verlag, Munich, 1966 on pages 96 to 102.

The optional catalysts are generally used in a quantity of up to 50% by weight, based on the quantity of catalysts of the present invention.

Surface-active additives, such as emulsifiers and foam stabilizers may also be included in the reaction mixture of the present invention. Suitable emulsifiers are for example the sodium salts of castor oil sulfonates or salts of fatty acids with amines, such as diethylamine oleate or diethanolamine stearate. Alkali or ammonium salts of sulfonic acids (such as dodecyl benzene sulfonic acid or dinaphthyl methane disulfonic acid) or of fatty acids (such as ricinoleic acid) or of polymeric fatty acids may also be used as surface-active additives.

Suitable foam stabilizers are, polyether siloxanes, particularly water soluble types. The structure of these compounds is generally such that a copolymer of ethylene oxide and propylene oxide is attached to a polydimethyl siloxane residue. Foam stabilizers such as these are described for example in U.S. Pat. No. 2,834,748; 2,917,480 and 3,629,308. In many cases, polysiloxane-polyoxyalkylene copolymers branched through allophanate groups according to German Offenlegungsschrift No. 2,558,523 are of particular interest.

Reacton retarders, for example acid-reacting substances, such as hydrochloric acid or organic acid halides, known cell regulators such as paraffins, fatty alcohols or dimethyl polysiloxanes as well as pigments, dyes, flameproofing agents (for example tris-chloroethyl phosphate, tricresyl phosphate or ammonium phosphate and polyphosphate),stabilizers against the effects of aging and weather, plasticizers and fungistatic and bacteriostatic substances and fillers (such as barium sulfate, kieselguhr, carbon black or whiting) may also be included in the reaction mixture of the present invention.

Further examples of surface-active additives, foam stabilizers, cell regulators, reaction retarders, stabilizers, flameproofing agents, plasticizers, dyes, fillers, fungistatic and bacteriostatic substances which may optionally be used in accordance with the invention and information on the way in which these additives are used and on their respective modes of action can be found in Kunststoff-Handbuch by Vieweg and Hochtlen, Vol. VII, Carl-Hanser-Verlag, Munich 1966, on pages 103 to 113.

The process according to the invention may be carried out by the one-shot process, by the prepolymer process or by the semi-prepolymer process. Machines of the type described in U.S. Pat. No. 2,764,565 may be used. Particulars of processing machines which may be used in accordance with the invention can be found in Kunststoff-Handbuch by Vieweg and Hochtlen, Vol. VII, Carl-Hanser-Verlag, Munich, 1966, on pages 121 to 205.

In the production of foams, it is also possible to carry out foaming in closed molds after the reaction mixture has been introduced into a mold. Suitable mold materials are metals (for example, aluminum) or plastics (for example, epoxide resin). The foamable reaction mixture foams in the mold and forms the molding. In-mold foaming may be carried out in such a way that the molding has a cellular structure at its surface, although it may also be carried out in such a way that the molding has a compact skin and a cellular core. It is possible to introduce foamable reaction mixture into the mold in such a quantity that the foam formed just fills the mold. However, it is also possible to introduce into the mold more foamable reaction mixture than is required for filling the interior of the mold with foam. This particular technique is known as overcharging and is disclosed in U.S. Pat. Nos. 3,178,490 and 3,182,104.

In many cases, known "external release agents" such as silicone oils, are used for in-mold foaming. However, it is also possible to use so-called "internal release agents", optionally in admixture with external release agents, of the type known for example from German Offenlegungsschriften Nos. 2,121,670 and 2,307,589.

According to the invention, it is also possible to produce cold-hardening foams (See British Pat. No. 1,162,517 and German Offenlegungsschrift No. 2,153,086).

However, it is of course also possible to produce foams by block foaming or by the known laminator process.

The products obtainable in accordance with the invention may be used, for example, as heat or cold insulators, mattresses, in furniture making, in the automotive industry, as synthetic elastomers and in the shoe industry.

The invention is further illustrated but is not intended to be limited by the following examples in which all parts and percentages are by weight unless otherwise specified.

EXAMPLES

Examples 1-5

(Production of the catalysts according to the invention)

General Procedure

A mixture of 250 g of xylene (dried and distilled) and 1 mole of the specified dialkylaminoalkanol was initially introduced into the reaction vessel. The mixture was heated with stirring to 100°-130° C. while an inert gas was passed over and 1 gram atom of sodium metal was added over a period of 8 hours at that temperature. After another 8 h, another 0.1 mole of dialkylaminoalkanol was added, followed by refluxing for another 8 to 24 h. After cooling, the sodium chloride precipitated was filtered off under suction, washed with a little ether, the filtrate and the washing liquid were combined and xylene and ether were then distilled off at 100° C./16 Torr. The liquid brown residues remaining were distilled in a high vacuum. After small quantities of low-boiling first runnings, the required product appeared as the second fraction. A large quantity of a solid, black residue was left behind.

EXAMPLE 1

Ketene-(bis-[N,N-dimethylaminoethyl)-acetal]was made from 1,1-dichloroethene and dimethylaminoethanol by the above-described procedure.

Yield: 33.2%; B.p. 70°-74° C./0.08; GC: 97.9%

Analyses: $C_{10}H_{20}N_2O_2$, 202, Calc. C: 59.4, H: 10.9, N: 13.9; Found C: 59.0, H: 9.8, N: 13.9, $^1$H-NMR: 3.15 (s, $=CH_2$), all NMR-data in ppm (δ-scale) (d$_6$-DMSO)

$^{13}$C-NMR: 56.8 (t, $=CH_2$), 164.6

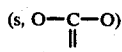

(non-decoupled spectrum)

EXAMPLE 2

Ketene-(bis-[N,N-dimethylaminoethyl)-acetal]was made from 1,1-dichloroethene and diethylaminoethanol by the above-described procedure.

Yield: 57.4%: B.p. 98°-100° C./0.07: GC: 98.0%

Analyses: $C_{12}H_{30}N_2O_2$. 258, Calc. C: 65.1, H: 11.6, N: 10.9 Found C: 63.9, H: 11.7, N: 11.2

$^1$H-NMR: 3.09 (s, $=CH_2$) (d$_6$-DMSO)

EXAMPLE 3

Ketene-(bis-[2-(N,N-dimethylaminoethoxy)-ethyl]-acetal was made from 1,1-dichloroethene and dimethylaminoethoxy ethanol by the above-described procedure.

Yield: 23%: B.p. 120°-127° C./0.07: GC: 94.0%

Analyses: $C_{14}H_{30}N_2O_2$, 290, Calc. C: 57.9, .3, N: 9.7; Found C: 57.9, H: 9.1, N: 10.1

$^1$H-NMR: 3.1 (s, $=CH_2$), (d$_6$-DMSO )

EXAMPLE 4

Ketene-(bis-[N,N-dimethylamino-1-methylethyl)-acetal]were made from 1,1-dichloroethene and dimethylaminoisopropanol by the above-described procedure.

Yield: 12.6%; B.p/ 72° C./0.1; GC: 81%

Analyses: $C_{12}H_{26}N_2O_2$, 230, Calc. C: 62.6, H: 11.3, N: 12.2 Found C: 61.7, H: 10.2, N: 12.4

$^1$ H-NMR: 3.24 (s, $=CH_2$), (d$_6$-DMSO)

EXAMPLE 5

Ketene-(bis-[N,N-dimethylaminopropyl)-acetal]was made from 1,1,-dichloroethene and dimethylaminopropanol by the procedure described above.

Yield: 43.5%, B.p. 108°-110° C./0.5, GC: 94.4%

Analyses: $C_{12}H_{26}N_2C_2$, 230, Calc. C: 62.6, H: 11.3, N: 12.2 Found C: 62.4, H: 10.9, N: 12.2

$^1$H-NMR: 3.08 (s, $=CH_2$), (d$_6$-DMSO).

EXAMPLES 6-19

Comparison of the reactivity of the catalysts according to the invention was made with a commercially available catalyst(catalyst WF-17, commercial product of Bayer AG).

Polyurethane foams were produced in known manner by rapidly mixing the components indicated in the following Tables.

| Example | 6 | 7 | 8 | 9 | 10 |
|---|---|---|---|---|---|
| Trifunctional poly* ether OH number 28 (pbw) | 100 | 100 | 100 | 100 | 100 |
| Water (pbw) | 3.1 | 3.1 | 3.1 | 3.1 | 3.1 |
| Silicon stabilizer KS 43 (pbw) (A product of Bayer AG) | 1.0 | 1.0 | 1.0 | 1.0 | 1.0 |
| Catalyst WF 17 (pbw) (A product of Bayer AG) | 0.5 | | | | |
| Catalyst I[b] (pbw) | | 0.5 | | | |
| Catalyst II[c] (pbw) | | | 0.5 | | |
| Catalyst IV[d] (pbw) | | | | 0.5 | |
| Catalyst V[e] (pbw) | | | | | 0.5 |
| TDI 65[a] (pbw) | 80 | 80 | 80 | 80 | 80 |
| Crude MDI (pbw) | 20 | 20 | 20 | 20 | 20 |
| Cream time (s) | 23 | 16 | 32 | 27 | 24 |

*Produced by the addition of 83 wt. % of propylene oxide and then 17 wt. % of ethylene oxide onto trimethylol propane.
[a]Mixture of 65% by weight of 2,4- and 35 wt. % of 2,6-diisocyanatotoluene
[b]Catalyst produced in Example 1
[c]Catalyst produced in Example 2
[d]Catalyst produced in Example 4
[e]Catalyst produced in Example 5.

Testing of the catalysts according to the invention in flexible foam

| Formulations | | 11 | 12 | 13 | 14 | 15 | 16 | 17 | 18 | 19 |
|---|---|---|---|---|---|---|---|---|---|---|
| Polyether*, OH No. 28 | Parts by weight | 100 | 100 | 100 | | | | | | |
| Polyether, OH No. 28 (acc. to examples 6-10) | Parts by weight | | | | 100 | 100 | 100 | | | |
| Polyether**, OH No. 28 | Parts by weight | | | | | | | 100 | 100 | 100 |
| Water | Parts by weight | 3.1 | 3.1 | 3.1 | 2.6 | 2.6 | 2.6 | 3.1 | 3.1 | 3.1 |
| Amine catalyst[1] | Parts by weight | 0.1 | 0.1 | 0.1 | 0.1 | 0.1 | 0.1 | 0.1 | 0.1 | 0.1 |
| Amine catalyst[2] | Parts by weight | 0.4 | 0.4 | 0.4 | 0.1 | 0.1 | 0.1 | 0.2 | 0.2 | 0.2 |
| Bis-dimethylamino-propyl formamide | Parts by weight | 0.5 | | | | | | | | |
| Dimethylethanolamine | Parts by weight | | | | | 0.6 | | | | |
| Triethanolamine | Parts by weight | | | | | | | 0.2 | | |
| Catalyst I[b] | Parts by weight | | 0.5 | | | 0.6 | | | 0.35 | |
| Catalyst V[e] | Parts by weight | | | 0.6 | | | 0.7 | | | 0.45 |
| PU-Crosslinker 56[3] | Parts by weight | | | | 0.6 | 0.6 | 0.6 | | | |
| Stabilizer KS 43[4] | Parts by weight | 1.0 | | | 0.75 | 0.75 | 0.75 | 0.75 | 0.75 | 0.75 |
| Dibutyl tin dilaurate | Parts by weight | 0.01 | 0.01 | 0.01 | | | | | | |
| TDI 80 | Parts by weight | | | | 80 | 80 | 80 | | | |
| TDI 65 | Parts by weight | 70 | 70 | 70 | | | | 70 | 70 | 70 |
| Crude MDI | Parts by weight | 30 | 30 | 30 | 20 | 20 | 20 | 30 | 30 | 30 |
| Index | Parts by weight | 100 | 100 | 100 | 100 | 100 | 100 | 100 | 100 | 100 |
| Cream time, s | Parts by weight | 5 | 5 | 5 | 4 | 5 | 5 | 5 | 5 | 5 |
| Gel time, s | Parts by weight | 51 | 55 | 54 | 55 | 65 | 80 | 64 | 68 | 70 |
| Rise time, s | Parts by weight | 80 | 85 | 90 | 88 | 100 | 120 | 96 | 104 | 110 |
| Gross density, kg/m³. DIN 53 420 | Parts by weight | 38 | 37 | 38 | 45 | 46 | 47 | 41 | 41 | 41 |
| Compression hardness, KPa DIN 53 577, $\epsilon = 40\%$ | Parts by weight | 1.9 | 1.7 | 1.8 | 2.4 | 2.9 | 2.7 | 2.7 | 3.1 | 2.6 |
| Tensile strength, KPa DIN 53 571 | Parts by weight | 85 | 80 | 80 | 80 | 80 | 80 | 50 | 50 | 50 |
| Breaking elongation, %, DIN 53 571 | Parts by weight | 180 | 185 | 185 | 155 | 145 | 140 | 85 | 85 | 75 |
| Compression set, %, DIN 53 572, $\epsilon = 50\%$, | Parts by weight | 6.9 | 7.4 | 7.7 | 5.1 | 4.1 | 5.1 | 3.5 | 3.9 | 3.7 |

| Testing of the catalysts according to the invention in flexible foam | | | | | | | | | |
|---|---|---|---|---|---|---|---|---|---|
| Formulations | 11 | 12 | 13 | 14 | 15 | 16 | 17 | 18 | 19 |
| 70° C., 24 h | | | | | | | | | |

[1]Bis-dimethylaminoethylether;
[2]triethylenediamine (33% in dipropylene glycol);
[3]a diamine-crosslinker; product of Bayer AG;
[4]silicone stabilizer, a product of Bayer AG
*Produced by the addition of 87 wt. % of propylene oxide and then 13 wt. % of ethylene oxide onto trimethylol propane
**Produced by the addition of 83 wt. % of propylene oxide and 17 wt. % of ethylene oxide onto such sorbitol
[b]Catalyst produced in Example 1.
[c]Catalyst produced in Example 5.

What is claimed is:

1. A process for the production of polyurethanes by reacting a polyisocyanate with a compound containing at least two isocyanate-reactive hydrogen atoms having a molecular weight of from 400 to 10,000 in the presence of a catalyst containing tertiary amino groups which catalyst corresponds to the formula

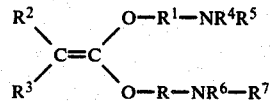

in which
R and $R^1$ (which may be the same or different) each represents a difunctional $C_2$–$C_6$ alkyl radical which may be branched and/or may contain ether or thioether or amino groups $NR^8$ or together form an ethylene or n-propylene radical which radical may be methyl-or ethyl-substituted
$R^2$ and $R^3$ (which may be the same or different) each represents hydrogen, an optionally branched $C_1$–$C_6$ alkyl radical, alkenyl or alkinyl or cycloalkyl or aryl or heteroaromatic radicals which may be alkyl-substituted or halogen substituted, or a halogen atom,
$R^4$, $R^5$, $R^6$ and $R^7$ (which may be the same or different) each represent a $C_1$–$C_{16}$ alkyl radical or two of the radicals together form a heterocyclic ring containing from 5 to 7 carbon atoms, and
$R^8$ represents hydrogen, a $C_1$–$C_6$ alkyl radical or a $C_5$–$C_7$ cycloalkyl radical.

2. The process of claim 1 in which a chain extending agent having a molecular weight of from 32 to 400 is present.

3. The process of claim 1 in which a blowing agent is present.

4. The process of claim 1 in which R and $R^1$ each represents a $C_2$–$C_3$ alkylene radical, $R^2$ and $R^3$ each represent hydrogen, $R^4$, $R^5$, $R^6$ and $R^7$ each represents a $C_1$–$C_4$ alkyl radical and $R^8$ represents a $C_1$–$C_4$ alkyl radical.

* * * * *